May 2, 1939.  E. H. GUNTER  2,156,981
MOWING MACHINE ATTACHMENT
Filed July 14, 1937  2 Sheets-Sheet 1

E. H. Gunter
INVENTOR
BY Victor J. Evans & Co.
ATTORNEYS

May 2, 1939.  E. H. GUNTER  2,156,981
MOWING MACHINE ATTACHMENT
Filed July 14, 1937  2 Sheets-Sheet 2

E. H. Gunter INVENTOR
BY Victor J. Evans & Co.
ATTORNEYS

Patented May 2, 1939

2,156,981

UNITED STATES PATENT OFFICE 2,156,981

MOWING MACHINE ATTACHMENT

Elzy Henderson Gunter, Wagener, S. C.

Application July 14, 1937, Serial No. 153,637

1 Claim. (Cl. 56—225)

The invention relates to a mower and more especially to an attachment for mowing machines.

The primary object of the invention is the provision of an attachment of this character, wherein the bat reel can be adjusted with respect to the sickle of the mower in accordance with the height of the growing material cut in a field so that the mower will more efficiently operate for the effective cutting of the material when standing in a field or other locality.

Another object of the invention is the provision of an attachment of this character, wherein the mowing machine is rendered more efficient in operation and the cut material will be caught and dumped at the will of the operator of the machine.

A further object of the invention is the provision of an attachment of this character, which is simple in its construction, thoroughly reliable and effective in operation, readily and easily installed and assuring adjustment of the bat reel as the occasion may require, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 3 is a fragmentary vertical transverse sectional view taken on the line 3—3 of Figure 1.

Figure 4 is a sectional view on the line 4—4 of Figure 3.

Similar reference characters indicate corresponding parts throughout the several views in the drawings.

Figure 1:
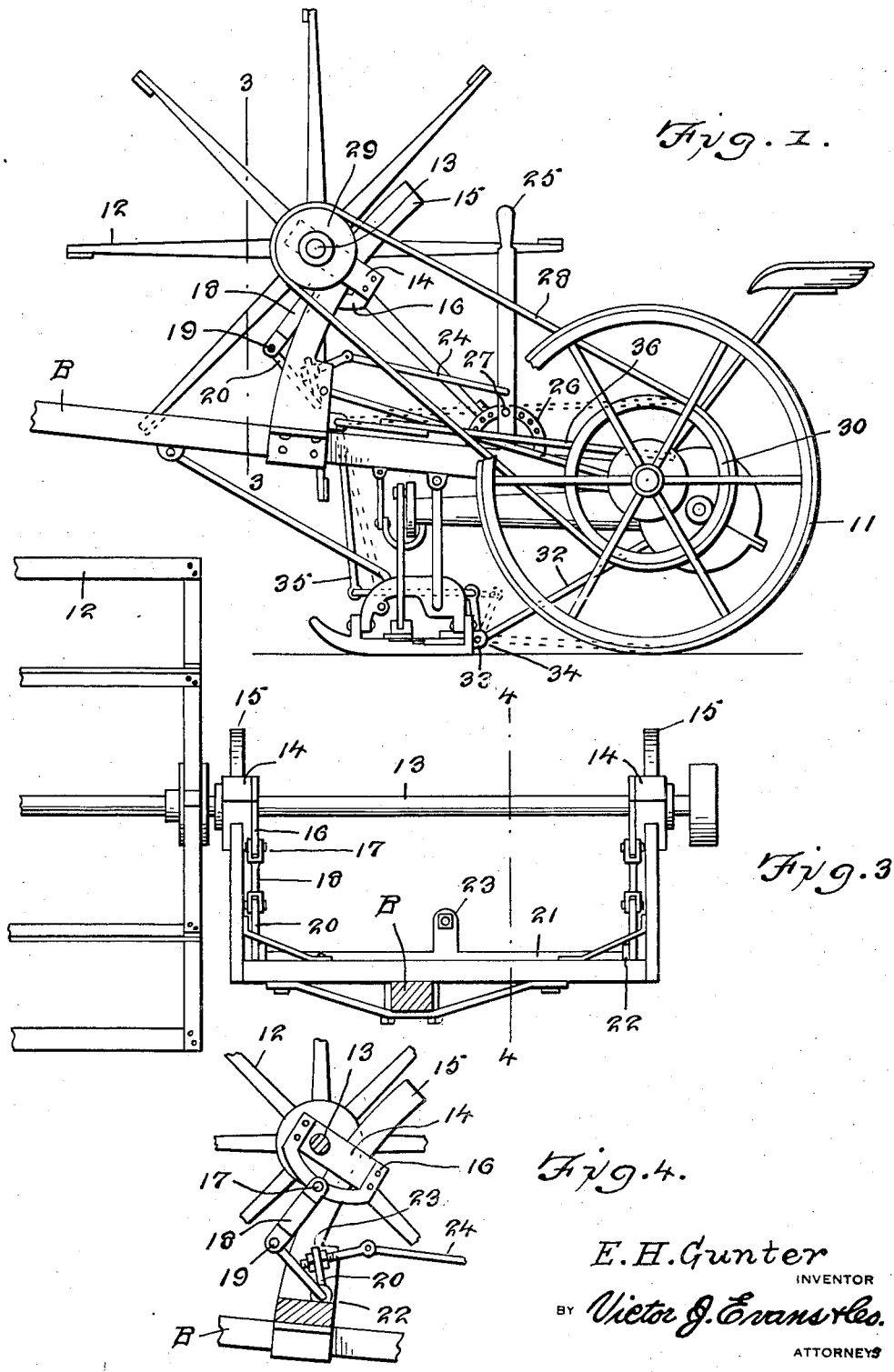
Figure 1 is a fragmentary side elevation of a mowing machine showing the attachment constructed in accordance with the invention applied.
Figure 2:
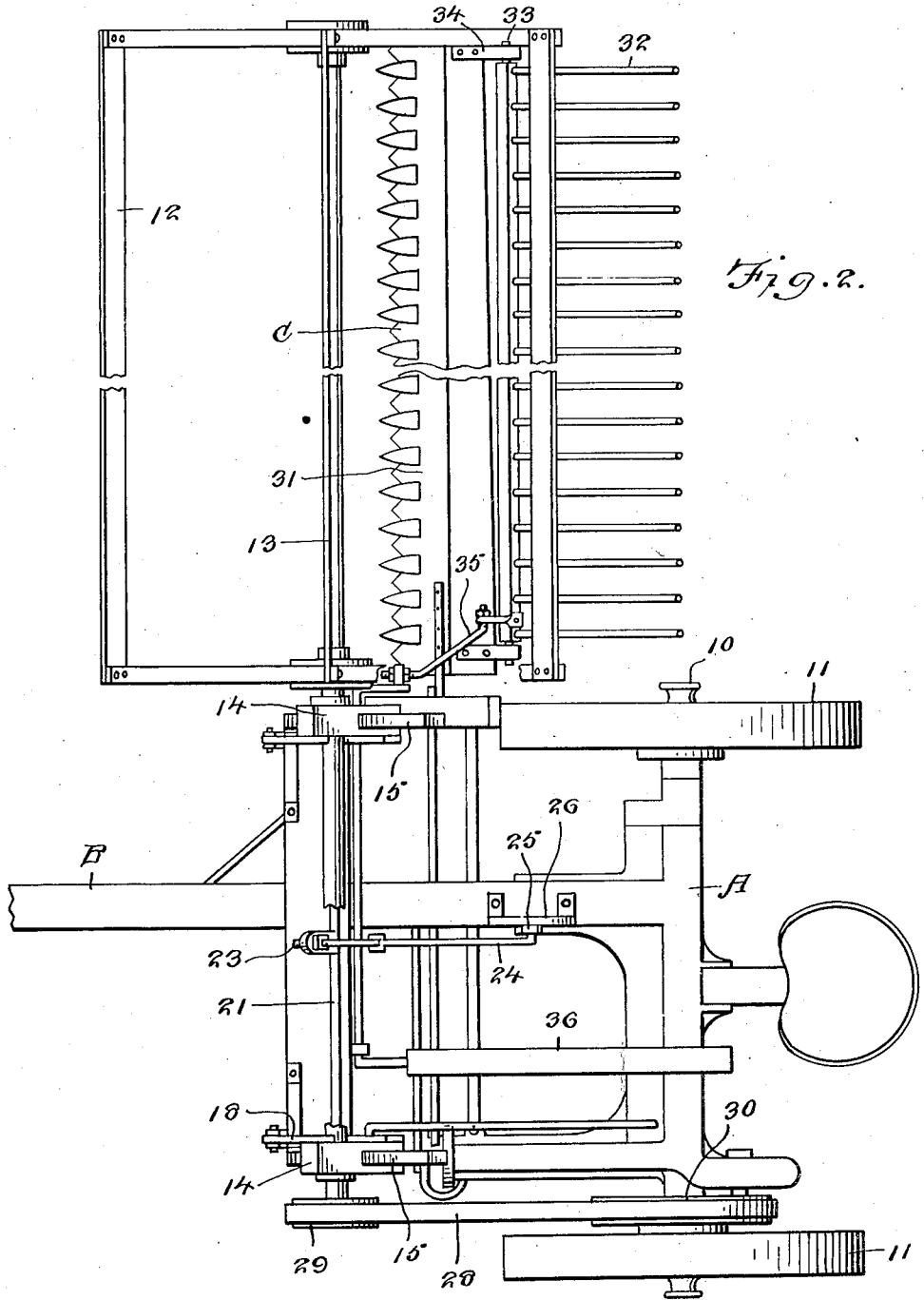
Figure 2 is a top plan view.

Referring to the drawings in detail, A designates generally the wheeled frame of a mowing machine having included therewith a draft tongue B, only a portion of the same being shown, while C is the sickle which is operated through connections with the wheel axle 10, the wheels being indicated at 11. Above the sickle C, which projects laterally from one side of the mowing machine or its frame A in cutting position, is a bat reel 12, its axle 13 being journaled in runners 14 slidably fitted upon arcuate shaped guide arms 15 which are fixed to the frame A at opposite sides thereof to coincide with each other.

The arcuate shaped arms 14 follow an arc having the axle 10 at its center and the runners 14 slidable thereon carry yokes 16 to which are centrally pivoted at 17 links 18 which are pivoted at 19 to cranks 20 of a rocking shaft 21 suitably journaled in bearings 22 fitted with the arms 15. This shaft 21 medially thereof is formed with a lever 23 with which is adjustably connected a throw rod 24 pivoted to a hand operated throw lever 25 associated with a keeper rack 26 on the frame A, the lever 25 being held in adjusted position through the medium of a latching pin or other device 27 engaging the rack 26. On manipulating the lever 25, the reel 12 can be raised or lowered following the arc curvature of the arms 15 and in this manner avoiding the tightening or slackening of an endless driving belt 28 trained over a pulley wheel 29 on the axle 13 and also trained over a power pulley wheel 30 driven by the wheel axle 10.

Arranged at the heel edge of the sickle guard 31 is a tined gatherer 32 which at opposite ends thereof is pivoted at 33 in bearings 34 fitted with the guard 31 and this gatherer 32 through link connections 35 suitably supported in association with a foot pedal 36 is operated thereby. The operator of the machine through foot control manipulates the pedal 36 for the raising of the gatherer 32 to gathering position for the catching of the cut material by the sickle C and when foot pressure is relieved from the pedal 36, the gatherer 33 will, through its own weight, become lowered for the discharge of its load or catchings. The bat reel forces the standing material rearwardly to be caught when cut by the sickle upon the gatherer 32 and this reel 12 is adjustable according to the height of the material to be cut or standing within a field or other locality for proper striking action on the material so that the same will fall onto the gatherer 32 when cut by the sickle.

What is claimed is:

An attachment for a mowing machine comprising a bat reel having a turning arbor, a stationary support, a pair of arcuate shaped arms rising from said support with the curvature thereof corresponding to an arc struck using an axle of the machine as a center thereof, runners adjustably fitted on said arms and carrying the arbor offset relative to said arms, yokes on the runners, a throw lever, connections including bell cranks and linkage between the throw lever and said yokes for the simultaneous shifting of the runners on the said arcuate shaped arms, and an actuating belt operating the reel.

ELZY HENDERSON GUNTER.